United States Patent
Cencer et al.

(10) Patent No.: US 10,183,682 B2
(45) Date of Patent: Jan. 22, 2019

(54) METHOD OF CONVERTING A BI-LEVEL AUTO-RACK RAILCAR

(71) Applicant: Trinity Rail Group, LLC, Dallas, TX (US)

(72) Inventors: Robert J. Cencer, Tipton, MI (US); Robert C. Ortner, Johns Creek, GA (US); George S. Creighton, Dallas, TX (US); Andrew Brown, Dallas, TX (US); James R. Mitzenberg, Coppell, TX (US)

(73) Assignee: Trinity Rail Group, LLC, Dallas, TX (US)

( * ) Notice: Subject to any disclaimer, the term of this patent is extended or adjusted under 35 U.S.C. 154(b) by 18 days.

(21) Appl. No.: 14/776,345

(22) PCT Filed: Mar. 14, 2014

(86) PCT No.: PCT/US2014/028901
§ 371 (c)(1),
(2) Date: Sep. 14, 2015

(87) PCT Pub. No.: WO2014/144477
PCT Pub. Date: Sep. 18, 2014

(65) Prior Publication Data
US 2016/0039432 A1     Feb. 11, 2016

Related U.S. Application Data

(60) Continuation-in-part of application No. 13/657,521, filed on Oct. 22, 2012, now abandoned, which is a
(Continued)

(51) Int. Cl.
*B23P 6/00* (2006.01)
*B61D 3/18* (2006.01)
(Continued)

(52) U.S. Cl.
CPC .............. *B61D 3/18* (2013.01); *B23P 6/00* (2013.01); *B61D 3/187* (2013.01); *B60P 3/07* (2013.01);
(Continued)

(58) Field of Classification Search
CPC ........ B23P 6/00; Y10T 29/49716; B60P 3/07; B60P 3/068; B61D 17/12; B61D 17/04; B61D 3/18; B61D 3/187
See application file for complete search history.

(56) References Cited

U.S. PATENT DOCUMENTS

| | | |
|---|---|---|
| 777,614 A | 12/1904 | Ellis |
| 2,603,168 A | 7/1952 | Edwards |

(Continued)

FOREIGN PATENT DOCUMENTS

| | | |
|---|---|---|
| EP | 0788958 A2 | 8/1997 |
| WO | 03/016118 | 2/2003 |

OTHER PUBLICATIONS

Norfolk Southern, "Conversion of Saf-Pak from tri-level to bi-level," Drawing No. D52609, dated May 2, 1985.
(Continued)

*Primary Examiner* — Jermie Cozart
(74) *Attorney, Agent, or Firm* — Fitch, Even, Tabin & Flannery LLP

(57) ABSTRACT

A method of shipping automobiles, railcars for shipping automobiles, and methods of manufacturing railcars for shipping automobiles to enable more efficient shipping of automobiles by facilitating conversion of autorack cars between unilevel, bi-level and tri-level configurations, and/or by providing increased load factors.

2 Claims, 13 Drawing Sheets

Related U.S. Application Data division of application No. 12/506,686, filed on Jul. 21, 2009, now Pat. No. 8,302,538.

(60) Provisional application No. 61/794,083, filed on Mar. 15, 2013.

(51) Int. Cl.
    *B61D 17/12*      (2006.01)
    *B60P 3/07*      (2006.01)

(52) U.S. Cl.
    CPC ......... *B61D 17/12* (2013.01); *Y10T 29/49716* (2015.01)

(56) References Cited

U.S. PATENT DOCUMENTS

| | | | |
|---|---|---|---|
| 3,119,350 | A | 1/1964 | Bellingher |
| 3,204,580 | A | 9/1965 | Spence et al. |
| 3,240,167 | A | 3/1966 | De Podesta et al. |
| 3,367,287 | A | 2/1968 | Dunlop |
| 3,547,049 | A * | 12/1970 | Sanders .................. B61D 3/02 105/370 |
| 3,916,799 | A | 11/1975 | Smith |
| 3,996,860 | A | 12/1976 | Ravani et al. |
| 4,318,349 | A | 3/1982 | Galasan |
| 4,666,211 | A | 5/1987 | Smith et al. |
| 4,668,142 | A * | 5/1987 | Fity .......................... B60P 3/08 410/26 |
| 4,759,669 | A | 7/1988 | Robertson et al. |
| 4,778,193 | A | 10/1988 | Torcomian |
| 4,786,222 | A | 11/1988 | Blodgett |
| 4,797,049 | A | 1/1989 | Gearin et al. |
| 4,924,780 | A | 5/1990 | Hart |
| 4,963,067 | A | 10/1990 | Gearin et al. |
| 5,040,935 | A | 8/1991 | Gearin et al. |
| 5,040,938 | A | 8/1991 | Gearin et al. |
| 5,105,951 | A | 4/1992 | Gearin et al. |
| 5,239,933 | A | 8/1993 | Murphy et al. |
| 5,253,975 | A | 10/1993 | Takaguchi |
| 5,375,534 | A | 12/1994 | Adams |
| 5,392,717 | A | 2/1995 | Hesch et al. |
| 5,415,108 | A | 5/1995 | Murphy et al. |
| 5,511,491 | A | 4/1996 | Hesch et al. |
| 5,601,033 | A | 2/1997 | Ehrlich et al. |
| 5,622,115 | A * | 4/1997 | Ehrlich .................... B61D 3/04 105/215.1 |
| 5,685,228 | A | 11/1997 | Ehrlich et al. |
| 5,743,192 | A | 4/1998 | Saxton et al. |
| 5,794,537 | A | 8/1998 | Zaerr et al. |
| 5,979,335 | A | 11/1999 | Saxton et al. |
| 6,138,579 | A | 10/2000 | Khattab |
| 6,205,932 | B1 | 3/2001 | Khattab |
| 6,244,801 | B1 * | 6/2001 | Klag ........................ B61D 3/18 410/24 |
| 6,273,004 | B1 | 8/2001 | Klag |
| 6,283,040 | B1 * | 9/2001 | Lewin ...................... B60P 3/08 105/393 |
| 6,446,561 | B1 | 9/2002 | Khattab |
| 6,551,039 | B1 | 4/2003 | Forbes |
| 6,821,065 | B2 | 11/2004 | Forbes |
| 6,837,169 | B2 | 1/2005 | Michaelian et al. |
| 7,047,889 | B2 | 5/2006 | Forbes |
| 7,360,979 | B2 | 4/2008 | Forbes |
| 7,401,559 | B2 | 7/2008 | Dawson et al. |
| 2003/0172838 | A1 | 9/2003 | Forbes |
| 2004/0016362 | A1 * | 1/2004 | Cencer .................... B61D 3/18 105/355 |
| 2008/0011187 | A1 | 1/2008 | Halliar et al. |
| 2008/0022883 | A1 | 1/2008 | Schorr et al. |
| 2008/0179020 | A1 | 7/2008 | Dawson et al. |
| 2008/0206009 | A1 | 8/2008 | Forbes |
| 2008/0276830 | A1 | 11/2008 | Dawson et al. |
| 2012/0024188 | A1 * | 2/2012 | Budnick ................... B61D 3/02 105/1.4 |
| 2013/0042786 | A1 | 2/2013 | Cencer et al. |

OTHER PUBLICATIONS

Norfolk Southern, "Conversion of Southern Tri-level to Bi-level Auto Racks," Drawing No. E52769, dated Sep. 16, 1985.

Kent Charles, "ATSF 700030". Feb. 1, 1984, retrieved from RailCarPhotos.com on Aug. 11, 2017.

Darrall Swift, "ATSF 700038". Nov. 25, 1993, retrieved from RailCarPhotos.com on Aug. 11, 2017.

Ron Hawkins, "ATSF 700061". May 27, 1995, retrieved from RailCarPhotos.com on Sep. 11, 2017.

Ron Hawkins, "ATSF 700127". Nov. 10, 1984, retrieved from RailCarPhotos.com on Sep. 11, 2017.

\* cited by examiner

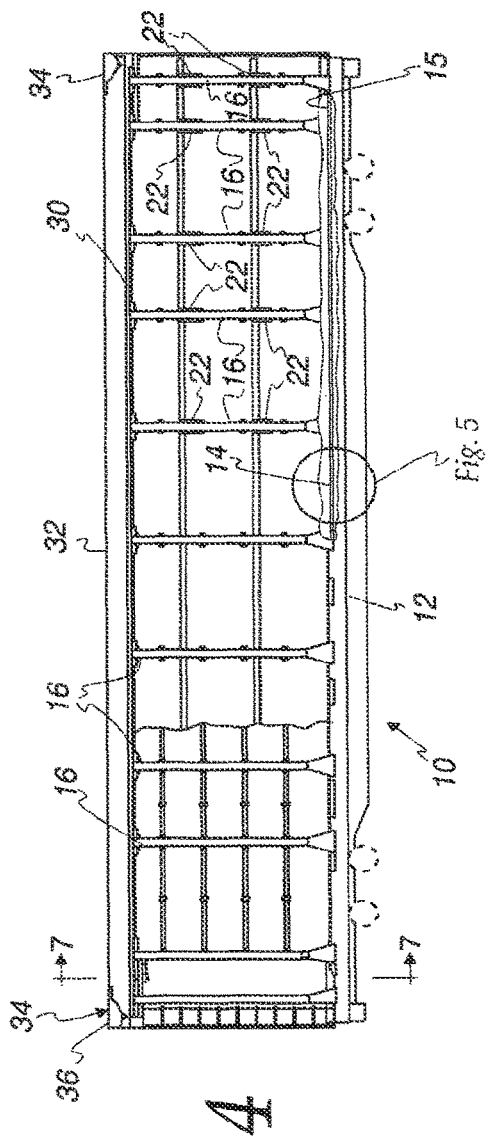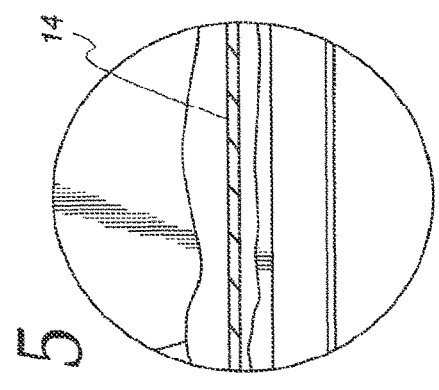

METHOD OF CONVERTING A BI-LEVEL AUTO-RACK RAILCAR

This application is a U.S. National Phase application filed under 35 U.S.C. § 371 of International Application PCT/US2014/028901, filed Mar. 14, 2014, designating the United States, which is a continuation-in-part of U.S. patent application Ser. No. 13/657,521, filed Oct. 22, 2012, now abandoned which is a division of U.S. patent application Ser. No. 12/506,686, filed on Jul. 21, 2009, now U.S. Pat. No. 8,302,538. Priority is claimed to the above applications, as well as to U.S. patent application 61/794,083, filed Mar. 15, 2013. All of the above applications are incorporated herein by reference.

BACKGROUND

The invention relates generally to railcars, and more particularly to railcars for shipping automotive vehicles.

For many years, autorack railcars have been used to ship new automotive vehicles from their places of manufacture to distribution centers. Shipping by rail can significantly reduce the cost of shipping such vehicles over long distances as compared with shipping by tractor-trailer.

One factor that limits the number of vehicles that can be shipped on an individual railcar is the height limit imposed on railcars due to the presence of bridges, tunnels and other obstructions over the railways. Another limiting factor is the need to maintain the center of gravity of the loaded railcar at or below a certain height above the top of the rail (ATR) for stability.

While bi-level autorack railcars generally are used to provide adequate clearance to ship certain vehicles such as pick-up trucks, mini-vans and sport utility vehicles, tri-level railcars are typically preferred for shipping passenger cars with lower vertical dimensions. The additional deck enables a larger number of automobiles to be shipped on a single railcar, thus increasing load factor and lowering the cost of transportation.

The mix between shorter height and taller height vehicles being transported in the United States varies depends on multiple ever-changing drivers, e.g., (1) customer demand, (2) the vehicle types being built by specific factories in the U.S. and (3) the mix coming into ports. Having a single rail car that can modified as a response to this ever changing mix in vehicle height would be desirable.

Many tri-level railcars have been constructed by building racks on flat cars. In some cases, the racks may be built on new flat cars that are custom built for auto rack use. In other cases, the racks may be built on flat cars that have been built and used previously for other commercial rail service. In the latter case, the flat cars may exhibit configurational variation as a result of strain incurred while in service. This may impose challenges relating to constructions of the racks, but nevertheless may be more desirable than using new flat cars, for economic and/or environmental reasons. In either case, the deck of the flat car functions as the first deck of the tri-level car, and the second and third decks are supported by the rack. The first, second, and third decks are commonly referred to as the A, B, and C decks respectively.

FIGS. 1 and 2 illustrate a prior art flat car of a type that has been used for auto rack service. The flat car comprises a center sill (a), side sills (b) and A-deck (c). A draft gear housing (d) protrudes above the deck at each end of the railcar. Locations at which auto rack posts are to be attached are indicated at (e).

One of the challenges in adapting flat cars for tri-level auto rack use is that a low flat car deck height has been considered necessary for Cg purposes and overhead clearance purposes, but a low deck height creates bottom clearance issues relative to the draft gear housing (d). The bottom clearance issues have typically been addressed through the use of ramps near the ends of the flat car, as shown schematically for purposes of example in FIG. 3, which raise the deck height near the ends of the flat car. Such ramps enable the flat car deck to have a central low portion along most of its length, providing a sufficiently low Cg for the loaded railcar, while providing adequate bottom clearance for most automotive vehicles to clear the draft gear housing near the ends. In the example shown in FIG. 3, each ramp comprises a generally horizontal raised end section (f) that may be, e.g., about 38 in. ATR, a first sloped section (g) having a horizontal dimension of about 5 ft., a generally horizontal raised intermediate section (h) that has a horizontal dimension of, e.g., about 4 ft. and is lower than section (f) by a height differential (k) which may be, e.g., about 4 to 5 in.; a second sloped section (i), that has a horizontal dimension of about 2 ft., and a generally horizontal center section (j) that is lower than section (h) by a height differential (l) which may be e.g., about 2 in.

The B and C decks are at a generally uniform elevation along the length of the car. The clearance over the A-deck is accordingly greater along the central portion and may be lower by, e.g., 6 to 7 in. along the end portions. The A-deck cannot accommodate certain automobiles with low ground clearance due to the transitions or ramps into and out of the central portion.

While bi-level auto rack railcars in the past have had generally horizontal A-decks, the provision of the low central portion in tri-level auto racks has been considered necessary and important not only from the standpoint of providing adequate clearance, but also from the standpoint of stability, so that the center of gravity of the loaded car is sufficiently low. In some tri-level railcars, at least three vehicles are required to be transported on a low central portion of the A-deck to ensure a sufficiently low center of gravity when the B and C decks are fully loaded.

During loading and unloading of automotive vehicles on the A-deck, sufficient clearance greater than the height of the automotive vehicles must be provided between the uppermost surfaces of the automobiles on the A-deck and the bottom surface of the B-deck to allow for vertical displacement or "bouncing" of the vehicles on their suspension systems as they are driven up and down the ramps near the ends of the A-deck. Tri-level cars have hinged end sections on their B decks that can be raised to provide clearance for automobiles being loaded on the A-deck. The hinged end sections are manually raised and lowered during loading and unloading operations. The hinged end sections must be in their lowered positions to support automobiles thereon.

In tri-level cars heretofore used in commercial rail service, adequate clearance is generally not maintained if the same number of vehicles is loaded on the A-deck as on the B and C-decks, requiring a reduced number of vehicles to be transported on the A-deck. While the B and C-decks can generally accommodate five typical passenger cars each in a conventional tri-level railcar, the A-deck can typically carry only four. The load factor for conventional tri-level railcars is 14 for the majority of passenger cars. Where four vehicles are carried on the A-deck, the automobiles in the end positions typically are inclined due to their location on the ramps.

With conventional tri-level cars, shippers must spend significant amounts of time determining the load makeup of a shipment. Load makeup refers to the specific types of vehicles loaded at specific positions in a railcar. Because conventional tri-level cars have different clearances on different decks and at different positions within individual decks, only specific types of automobiles can be loaded at specific positions. Thus, loading a conventional tri-level car entails locating vehicles that can fit within each position and arranging all of the vehicles on the car to use the available capacity efficiently. In some cases, if no automobiles are being shipped that fit within a particular position, the position remains empty, which can increase the number of railcars required to ship a particular number of automobiles.

As consumers' preferences among different types of automobiles fluctuate due to economic factors such as changes in fuel prices as well as non-economic factors, the mix of automobiles being shipped by rail changes and the demand for various types of vehicle-carrying railcars fluctuates, as do the load makeup decisions. Shipping by rail remains the most cost-efficient method of transporting most vehicles over long distances, and autorack railcar design has improved over the years to enable autorack railcars to transport automobiles more securely and efficiently. However, there remains a need for further improvements in methods for transport of automotive vehicles by rail, and in the auto rack railcars themselves, as well as in methods of manufacturing auto rack railcars.

SUMMARY

There is provided a variable capacity autorack railcar that can be converted between one or more of a unilevel configuration, a bi-level configuration and a tri-level configuration by adding or removing one or more decks.

In some embodiments, when the railcar is in a bi-level configuration, a third deck may be added by first removing the roof of the bi-level car, then lowering the upper deck or B-deck of the bi-level car, then lowering an additional deck into position as the C-deck, and thereafter replacing the roof.

In some embodiments, a bi-level autorack car may be built to the maximum allowed height with an upper deck bolted in place. The upper deck may have hinged end sections locked in the "level" position. That is, the B-deck of the bi-level railcar may have pivotable end sections of the type normally used on the B-deck of tri-level railcars, with the pivotable end sections being secured in place and not pivoted during normal operation of the bi-level railcar. The car may have a bolt-on roof. The car may be converted to a tri-level configuration by removing the bolt-on roof, repositioning the intermediate deck downward to the "tri-level" position with the end sections able to pivot up and down, installing from the top a second fixed end deck at its "tri-level" position, and reattaching the roof. The car could be converted back to a bi-level by reversing these steps.

In another approach, a conventional bi-level (which does not have hinged end sections on its B-deck) may be converted to a tri-level having hinged end sections on its B-deck by the following method: removing the roof; removing the "B" deck; inserting a new "B" deck with hinged ends; re-installing the "B" deck as a "C" deck; and reinstalling the roof.

Another approach is to make the conversion without removing and replacing the roof, using rollers. The rollers may be supported by the sidewall posts, braces or other structural elements of the car. The existing upper deck may be unbolted from the sides of the car and lowered to the "tri-level" position for a "B" deck. The added deck may be installed by first installing deck braces fitted with rollers, and then feeding the C deck into the car on the rollers in sections or in one piece into position. The rollers may then be lowered or removed, and the top surface of the deck fastened to the braces by bolting or welding. Side fillers may be installed alongside the deck to reduce or eliminate gaps between the sides of the deck and the side walls by bolting or welding.

In another variant, the upper deck of the bi-level car may be fitted with rollers that engage a rail mounted on top of the deck braces. The upper deck would be unbolted so it can roll along the rail. The side fillers would be removed and the deck would be rolled out of one end of the car. The rail system would be unbolted from the sides of the car and lowered to the "tri-level" position for a "B" deck. A second deck would be placed on top of the lower deck and the two would be rolled back into the car on the repositioned rail system. The second deck may then be raised to the "tri-level" position for a "C" deck and braces installed under the deck along with side fillers. The hinged end sections of the second deck may be released so that they can be pivoted up and down.

In other embodiments, one or more decks may be added to or removed from a railcar for transporting motor vehicles by moving the deck longitudinally, and twisting the deck about its longitudinal axis to increase clearance relative to side posts.

The flat car onto which the rack is built could be either a low level flat or standard level flat, preferably low level. The side fillers are provided because the post spacing at the ends of the car across the car is narrower than in the center section of the car.

Various additional methods of converting railcars may be described as follows.

One additional method comprises converting a bi-level auto-rack railcar to a tri-level auto rack railcar, the bi-level auto rack railcar comprising a first deck, a second deck above the first deck, a roof structure, side walls extending from the first deck to the roof, and end doors extending between the first deck and the roof, the method comprising: removing the roof structure; adjusting the height of the second deck; lowering a third deck into the railcar above the second deck using an overhead crane; and replacing the roof.

Another additional method comprises converting a bi-level auto-rack railcar to a unilevel railcar, the bi-level autorack railcar comprising a first deck capable of supporting motor vehicles for transport in commercial rail operation, a second deck spaced above the first deck by a distance sufficient to provide clearance for vehicles on the first deck, the second deck also being capable of supporting motor vehicles for transport in commercial rail operation, a roof structure, side walls extending from the first deck to the roof, and end doors extending between the first deck and the roof, the end doors being movable between open positions in which access to the railcar interior is permitted, and closed positions in which the interior of the railcar is fully enclosed to prevent unauthorized access, the method comprising: removing the roof structure to facilitate crane access to the railcar interior; removing the second deck from the railcar using a crane; and replacing the roof to provide an interior space that is capable of accommodating and enclosing vehicles of a height greater than the distance by which the second deck was spaced above the first deck.

Another additional method comprises converting a bi-level auto-rack railcar to a tri-level auto rack railcar, the bi-level auto rack railcar comprising a support structure, a first deck, a second deck supported above the first deck by the support structure, a roof structure, side walls extending from the first deck to the roof, and end doors extending between the first deck and the roof, the method comprising: moving a third deck into the railcar using rollers mounted on one or more of the support structure, the second deck and the third deck; and securing the third deck to the support structure.

Another additional method comprises converting a multilevel autorack railcar to a unilevel railcar, the multilevel autorack railcar comprising a support structure, a first deck capable of supporting motor vehicles for transport in commercial rail operation, a second deck supported by the support structure and spaced above the first deck by a distance sufficient to provide clearance for vehicles on the first deck, the second deck also being capable of supporting motor vehicles for transport in commercial rail operation, a roof structure, side walls extending from the first deck to the roof, and end doors extending between the first deck and the roof, the end doors being movable between open positions in which access to the railcar interior is permitted, and closed positions in which the interior of the railcar is fully enclosed to prevent unauthorized access, the method comprising: removing the second deck from the railcar using rollers to provide an interior space that is capable of accommodating and enclosing vehicles of a height greater than the distance by which the second deck was spaced above the first deck. In this method, the rollers may be mounted, e.g., on the support structure or on the second deck.

Another additional method comprises building a mixed use bi-level railcar in which the B deck is mounted much higher than in conventional bi-level railcars, e.g., at the height of the C deck in a tri-level railcar. A bi-level car with this configuration may be used to transport tall vans such as Sprinter vans or other tall vehicles on its A deck while transporting conventional vehicles on its B deck. This type of bi-level car can be built by removing the B deck from a tri-level railcar by any of the methods described in this application without other major structural changes.

Another additional method comprises building a mixed use bi-level railcar in which the B deck is mounted lower than in conventional bi-level railcars, e.g., at the height of the B deck in a conventional tri-level car. A bi-level car with this configuration may be used to transport tall vans such as Sprinter vans or other tall vehicles on its B deck while transporting conventional vehicles on its A deck. This type of bi-level car can be built by removing the C deck from a tri-level railcar by any of the methods described in this application without other major structural changes.

A method of installing a removable roof on an autorack railcar having at least one deck for supporting automotive vehicles, side walls extending upward from the deck, and end doors which are movable between open positions in which access to the railcar interior is permitted, and closed positions in which the interior of the railcar will be fully enclosed to prevent unauthorized access after installation of the roof may comprise installing removable longitudinal roof supports on upper portions of the side walls, and welding the roof to the longitudinal roof supports. Installing removable longitudinal roof supports on upper portions of the sidewalls may comprise bolting channels to upper ends of sidewall posts.

The railcars converted by the methods described herein may comprise, for example, a tri-level railcar capable of transporting in commercial rail service increased percentages of passenger cars having certain predetermined characteristics with a load factor of at least 15, comprising: a pair of side walls; end doors at each end of the railcar; and first, second and third decks. The railcar may have substantially equal top and bottom clearances above each of said decks to enable automobiles having the predetermined characteristics to be loaded onto, transported to a destination on, and unloaded from all decks of the railcar using circus loading and unloading techniques, without the need to raise end portions of the second deck to provide increased vertical clearance for loading on the A deck, and without any clearance-related restrictions as to which individual automobiles are in which positions on the decks during transport of automobiles on the railcar. Each of the decks may provide sufficient clearance to permit any automobile having the predetermined characteristics to be driven from a first end to a second end of the deck at a speed up to about 5 mph without any portion of the passenger car, other than the tires, contacting the deck. Each of the decks may be substantially horizontal along substantially the entire length of each deck. The railcar may in some embodiments have an empty weight of no more than about 116,000 lbs. In some embodiments, the railcar, when fully loaded at up to about 24,000 lbs. per deck with vehicles having the predetermined characteristics, may have a center of gravity or Cg no greater than 98 in. ATR. The railcar may have a removable roof structure and a fully enclosed interior. The removable roof structure may be secured to the side walls by fasteners that are readily accessible from the interior but not from outside the railcar.

In some embodiments, the center of gravity of the railcar may be maintained at an acceptably low elevation while substantially eliminating the conventional height variations and ramps on the A-deck. In some embodiments, this may entail reducing weight in the upper portions of the railcar by using lighter materials than those that have been used in the past in upper portions of the railcar. Elimination of the above-described variations in A-deck height in prior art tri-levels may not only alleviate ground clearance concerns associated with certain high performance automobiles that have lower spoilers, but may also eliminate or reduce the need to provide extra clearance for vertical movement or bouncing associated with the ramps near the ends of the A-deck.

The railcar may comprise a unit car, i.e., a railcar having a monocoque body, or may comprise a rack built on a conventional flat car, an upsill flat car, or a flat car having a 39½ ATR running surface. In one approach where a flat car having a 39½ ATR running surface is employed, the railcar has an overall height of approximately 20'-2". The B and C decks are permanently fixed, i.e. bolted or welded in place along their entire length, rather than having hinged end sections as in the prior art cars discussed above. The A-deck does not include ramps of the type described above which automobiles must travel up or down during loading and unloading, or rest on in an inclined orientation during transportation. The A-deck is substantially horizontal with only minor variations in elevation.

The clearances above each of the three decks preferably are approximately equal. In one approach a minimum clearance of about 64 to 66 in., measured near the deck end 30"off center may be provided for each of the decks. For the C deck, the minimum clearance may need to be measured from the deck to roof-mounted door hardware such as hardware associated with a roof-mounted radial door pivot, which may be as much as 1 to 2 in. below the roof.

In some cases, the rack may be made of conventional materials. In other cases, as mentioned above, the center of gravity Cg may be maintained at an acceptably low elevation by using lighter materials, e.g. by reducing the weights of the side screens of the railcar above the B-deck and/or the roof structure of the railcar by making them thinner and/or making them from a lighter weight material. For example, the roof structure or side screens of the railcar may be made from aluminum, rather than steel, as conventionally used in railcars. Because the side screens and roof generally do not add support to the railcar structure, and are instead used to protect the interior of the railcar from environmental elements and vandals, use of less robust materials at the higher elevations may be acceptable because the screens and roof are not as accessible to potential intruders or vandals.

In another approach to maintaining an acceptably low Cg, the load bearing capacity of the B and C decks, and the loads on fully loaded B and C decks, may be reduced relative to those of conventional tri-level auto rack railcars, enabling lighter structural elements to be employed. In conventional tri-level railcars, the B and C decks are typically rated to a maximum load bearing capacity of approximately 24,000 lbs. According to this approach, the rating of the B and C decks may be reduced below 24,000 lbs. to, for example, approximately 22,000 lbs., to lower the center of gravity of the fully loaded railcar to an acceptably low level, where an acceptably high load factor can be attained without exceeding 22,000 lbs. per deck.

As discussed above, the A-deck preferably does not include conventional ramps as described above with reference to FIG. 3, and may therefore be referred to as "substantially horizontal." This term as used herein is not intended to exclude variations in height across the width of the deck, nor to exclude minor variations in deck height that do not materially affect vertical clearance.

The substantially horizontal A-deck facilitates loading automobiles on the A-deck in the same manner as on the B and C decks. Thus, additional clearance is not required above the A-deck to accommodate vehicles being loaded on the A-deck to account for vertical displacement or bouncing of the vehicles traveling up and down conventional end ramps. Thus, an equal number of vehicles can be loaded on the A-deck as on the B and C-decks, increasing the overall load factor of the railcar for most types of automobiles. The substantially horizontal A-deck also accommodates loading sports cars and other vehicles with low ground clearances on the A-deck that could not be loaded on the A-deck of prior art tri-level railcars due to spoilers or other structures near the bottom of the vehicles contacting the A-deck at or near the ramp structures.

Limitations on load makeup may be further reduced by providing approximately equal clearances between all decks to facilitate uniform loading of vehicles in all positions within the railcar, such that vehicles can be loaded in any position in the railcar. Thus, time is saved during loading because a shipper will not need to determine the most efficient load makeup of the railcar to maximize the carrying capacity and ensure that vehicles of varying heights will fit in positions within the railcar having unequal clearances as required with prior art railcars. Additionally, the railcar will not have to be shipped with empty positions as sometimes occurs with prior art tri-levels, when the vehicles to be shipped do not include vehicles for all of the specific positions in the railcar.

BRIEF DESCRIPTION OF DRAWINGS

FIG. 4 is a side elevation of a railcar in accordance with an embodiment of the invention.

FIG. 5 is a detail view of a portion of the railcar of FIG. 4.

DETAILED DESCRIPTION OF PREFERRED EMBODIMENTS

Figure 1:
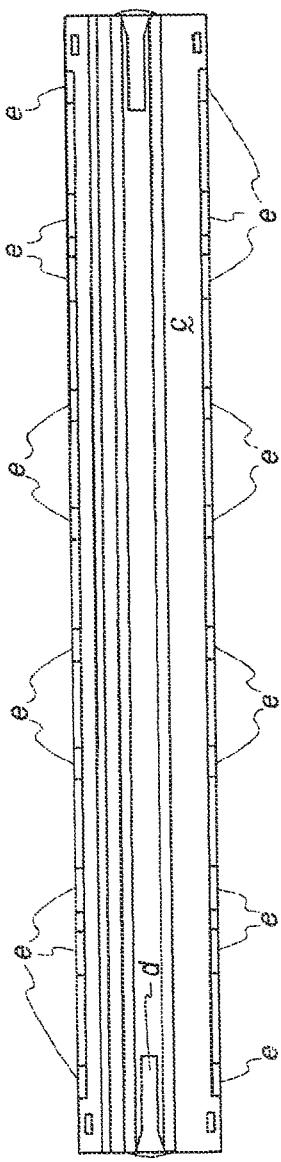
FIG. 1 is a plan view of a prior art flat car for use in auto rack service.
Figure 2:
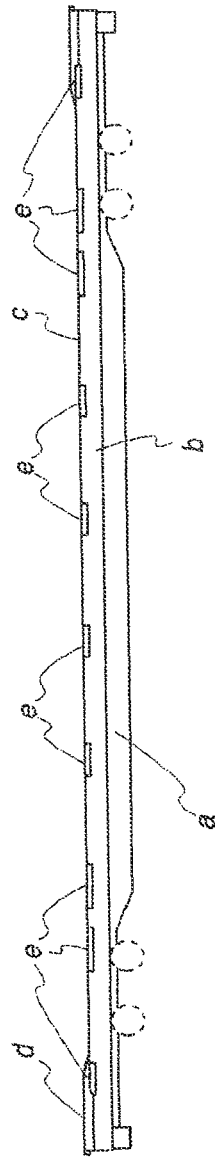
FIG. 2 is a side elevation of the flat car of FIG. 1.
Figure 3:
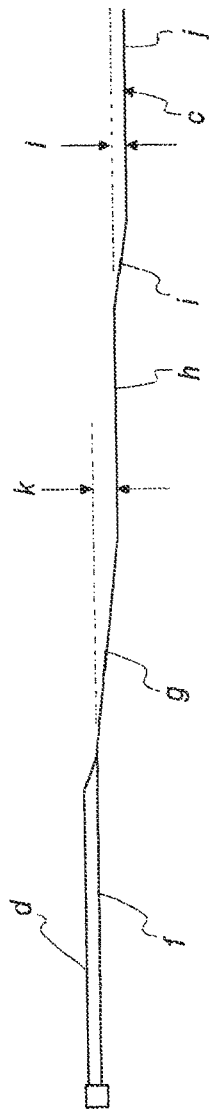
FIG. 3 is a detail view of an end of a portion of the flat car of FIG. 1.
Figure 6:
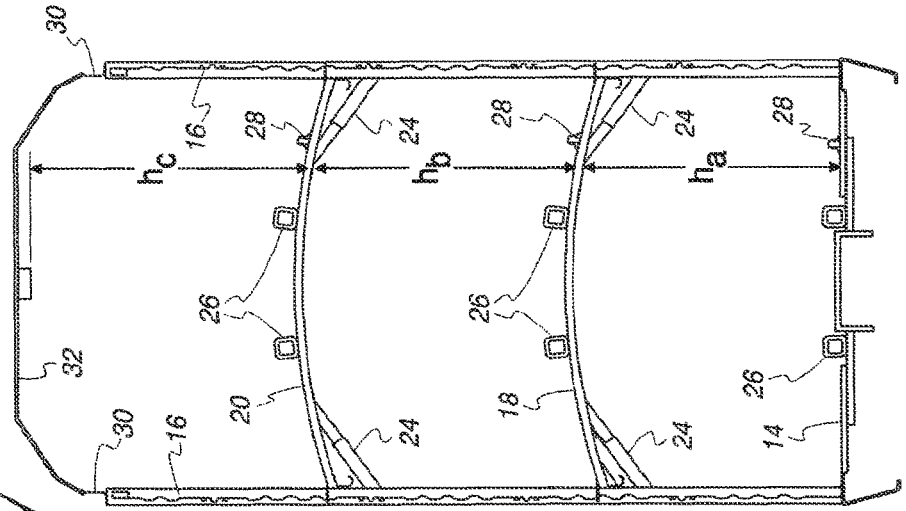
FIG. 6 is an end view of the railcar of FIG. 5.
Figure 7:
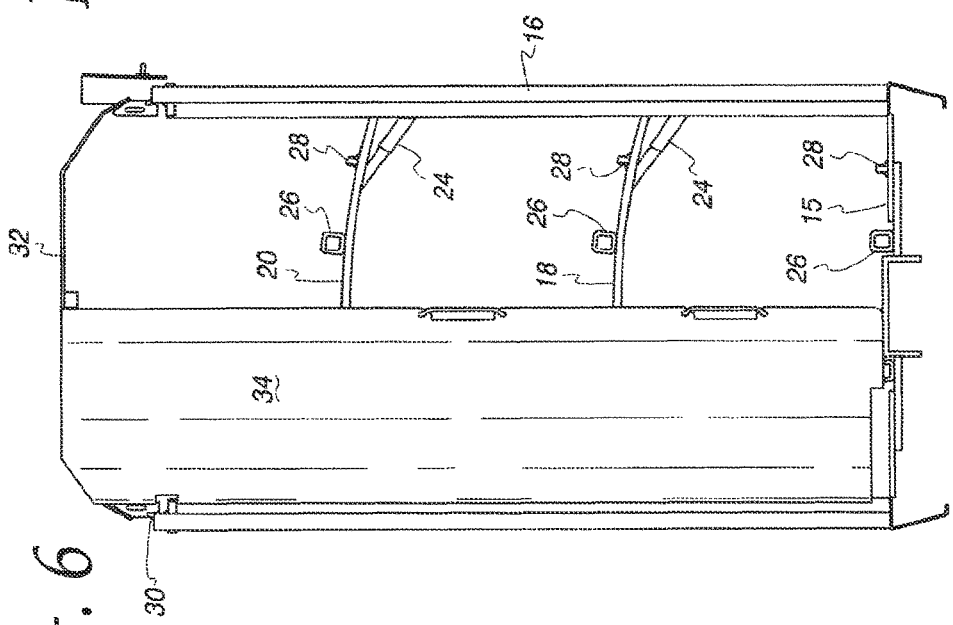
FIG. 7 is a section of the railcar of FIG. 5, taken at lines 7-7 in FIG. 5.
Figure 8:
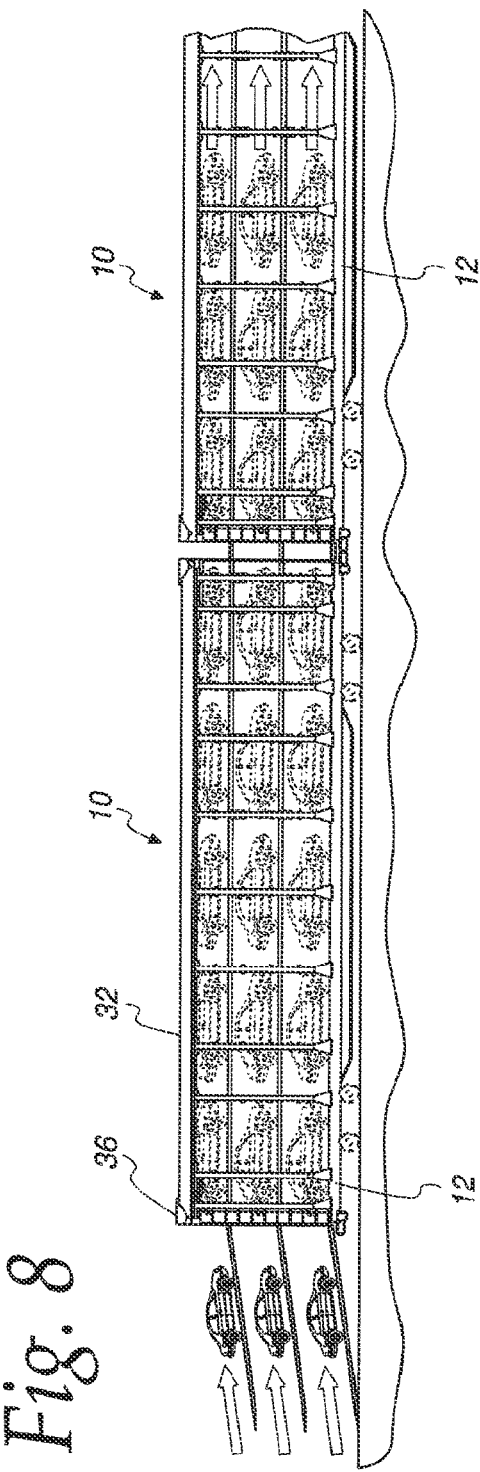
FIG. 8 illustrates a method of loading railcars.

The embodiments described herein comprise a method of shipping automobiles, a railcar for shipping automobiles, and methods of manufacturing and converting railcars for shipping automobiles.

FIGS. 4-8 illustrate a tri-level auto rack railcar 10 that comprises a flat car 12 having a rack structure constructed thereon. The flat car has a deck that functions as the A-deck of the railcar. The A-deck is substantially at the same elevation along its entire length, with a center portion 14 and end portions 15 at substantially the same height. The rack structure comprises a plurality of vertical posts 16, and B and C decks 18 and 20 respectively supported by the posts.

Each of the decks is connected to the posts by vertical plates 22 and knee braces 24. Tire guides 26 and a chock track 28 are provided on each deck. Longitudinal members 30 such as roof rails and/or top chords tie the vertical posts together at their upper ends. A corrugated roof 32 encloses the top of the car. Radial end doors 34 having a top panel 36 overlying an end portion of the roof and pivotally attached thereto are preferably employed at each end of the car.

The B deck 18 is fixed along its entire length, rather than having hinged end sections as in the prior art cars discussed above, so that the B deck contributes to the strength and rigidity of the rack structure. To provide sufficient clearance in the A1 and A5 positions, the B deck is positioned at a higher elevation than in conventional auto rack cars. Minimum clearances of $h_a$, $h_b$ and $h_c$, measured 30" off center are maintained above the A, B and C decks respectively. The minimum clearances are preferably equal, and may be, e.g., between 64 and 66 in. A clearance of may be provided for each of the three decks. Clearances above each of the three decks may be approximately equal.

The railcar may be based on a conventional flat car, an upsill flat car, or a flat car having a 39½" ATR (above top of rail) running surface. To facilitate maintenance of appropriate clearances, high cambered decks are preferably employed at both the B and C level. The overall height of the railcar is preferably equal to the maximum height permissible in North America under applicable AAR regulations, i.e., 20' 2".

Provision of fixed decks facilitates loading in that the all three decks may be continuously loaded and unloaded without the need to stop loading and unloading to pivot the B deck end sections. The ability of the B deck 18 to function as a structural member of the railcar from end to end may eliminate the need for heavier posts at certain locations. In existing auto rack cars, the number 3 and number 4 posts, i.e., the third and fourth posts from the end of the car, are often heavier than other posts. In the illustrated embodiment of the invention, all of the posts may be of the same or similar cross-section.

The method of shipping automobiles described herein enables improved shipping of new automotive vehicles by using assessment of vehicle heights and other relevant parameters for new automotive vehicle sales, and providing railcars that will be capable of transporting newly manufactured automobiles in commercial rail service with an increased load factor for an increased proportion of vehicles, taking into account constraints on overall railcar height, center of gravity (Cg), maximum gross weight, and maximum empty weight.

Figure 9:
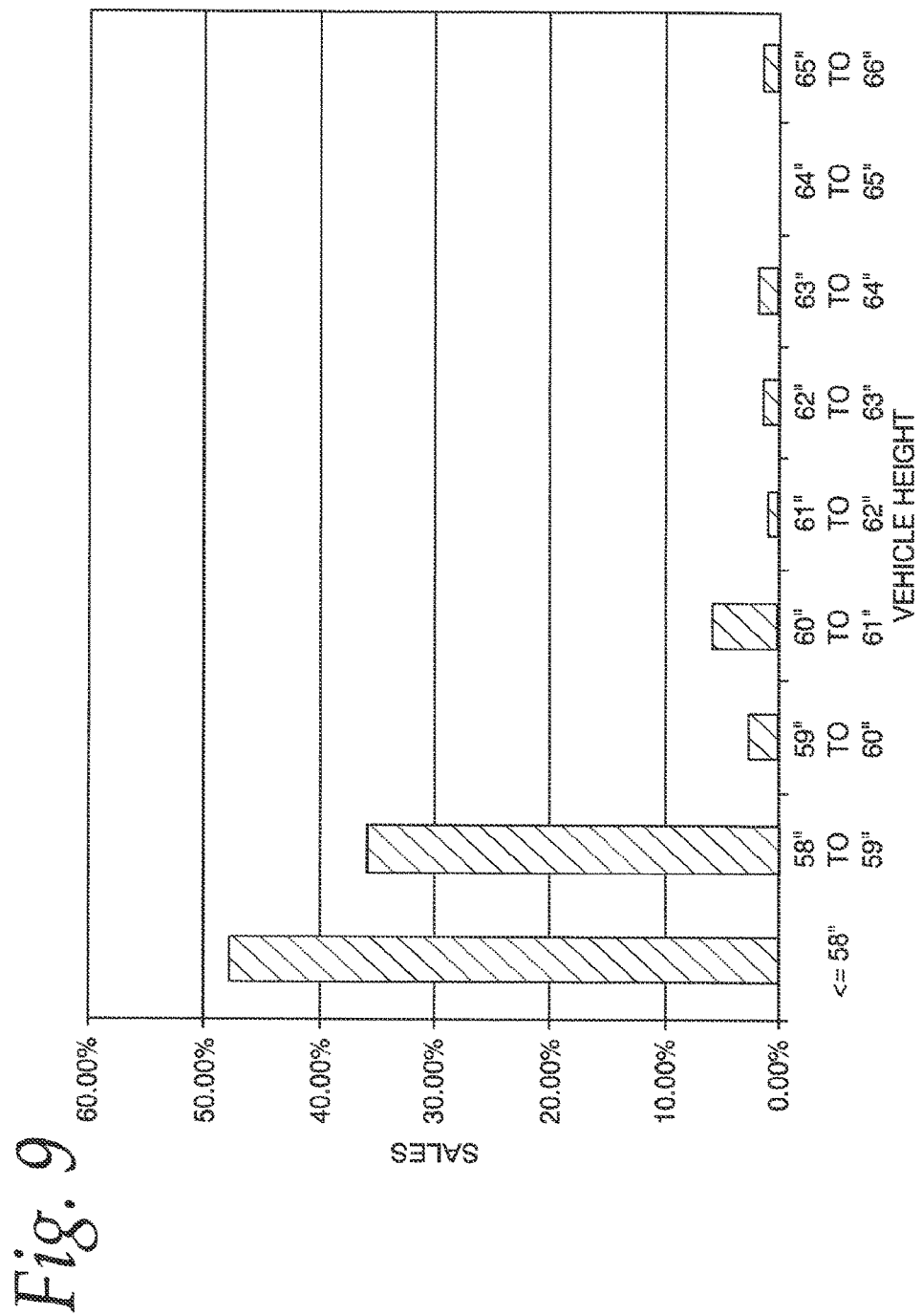
FIG. 9 illustrates the percentages of vehicles of various heights within a defined group of passenger cars.

To project vehicle heights and other relevant parameters for future new automotive vehicle sales, recent data on such parameters as well as industry trends may be taken into account. As an example of data that may be useful, Table 1 below provides data on vehicle height as a percentage of car and truck sales in the United States from January through November 2008. FIG. 9 illustrates this data graphically.

TABLE 1

Car and Truck Sales vs. Vehicle Height 2008

| Vehicle Height | Car & Truck Sales |
| --- | --- |
| <=58" | 25.28% |
| 58" to 59" | 18.92% |
| 59" to 60" | 1.40% |
| 60" to 61" | 3.12% |
| 61" to 62" | 0.52% |
| 62" to 63" | 0.70% |
| 63" to 64" | 0.96% |
| 64" to 65" | 0.76% |
| 65" to 66" | 0.72% |
| 66" to 67" | 1.25% |
| 67" to 68" | 1.25% |
| 68" to 69" | 2.64% |
| 69">= | 42.47% |

Table 1 shows that, according to this data, about 25.28% of cars and trucks sold in the United States in the first eleven months of 2008 had a height of less than or equal to 58 in, and about 18.92% had a height of between 58 and 59 in. Additional data is provided for other car and truck heights.

Figure 11:
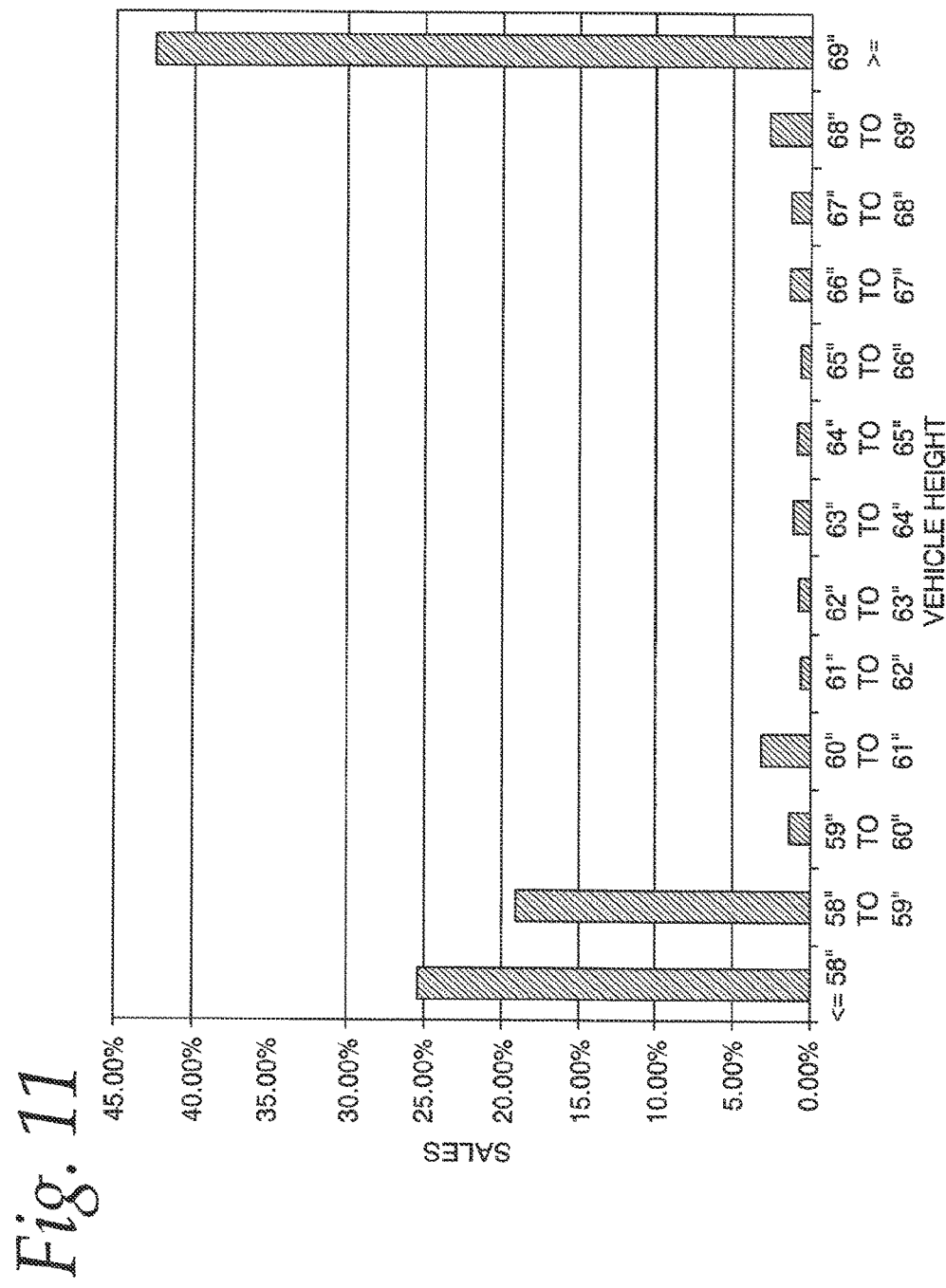
FIG. 11 illustrates the percentages of vehicles of various heights within a defined group of vehicles including passenger cars and trucks.

Table 2 provides a similar analysis specifically for cars. Table 2 indicates, for example, that 47.69% of cars sold in the United States in the first eleven months of 2008 had a height of less than 58 in. and that 35.7% had a height of between 58 and 59 in. Additional data is provided for other car heights. The data in Table 2 is illustrated graphically in FIG. 11.

TABLE 2

Car Sales vs. Vehicle Height 2008

| Vehicle Height | Car Sales |
| --- | --- |
| <=58" | 47.69% |
| 58" to 59" | 35.70% |
| 59" to 60" | 2.65% |
| 60" to 61" | 5.88% |
| 61" to 62" | 0.99% |
| 62" to 63" | 1.33% |
| 63" to 64" | 1.82% |
| 64" to 65" | 0% |
| 65" to 66" | 1.35% |

Two interesting conclusions that can be drawn from the data in Tables 1 and 2 are that the percentage of cars having heights above 61 in. is relatively low, and that the number of cars and trucks having heights from 61 to 66 in. is relatively low. In designing railcars to transport new automotive vehicles, data such as that in Table 1 and Table 2 may be used in conjunction with analysis of industry trends to guide decisions as to selection of deck height limitations.

In addition to assessment of vehicle heights for vehicles manufactured within a predetermined area and a predetermined time period, additional steps that may be taken to guide design of auto rack railcars preferably include assessing bottom clearance, vehicle weight, Cg and vehicle width for vehicles that may be transported on the auto rack railcars. The method of shipping automotive vehicles described herein preferably takes all of these factors into account in designing and building auto rack railcars.

The method also preferably comprises circus loading individual passenger cars onto a plurality of railcars, with each railcar having a load factor of at least 15 for a large percentage of passenger cars. The preferred railcar described herein is capable of commercial rail transport, with a load factor of at least 15, of over 90% of passenger cars included in the above data, without restriction as to where any of the individual passenger cars are positioned on the railcars, with the decks remaining fixed throughout loading, transportation and unloading of the cars. In some cases, it may be possible to load all three decks simultaneously at the departure point, and/or to unload all three decks simultaneously at the destination.

The railcars may be manufactured by various methods, e.g., (1) constructing new flat cars and new racks in an integrated manufacturing operation; (2) building racks on flat cars that have previously been used in commercial rail service; and (3) converting bi-level auto rack railcars into tri-level auto rack railcars.

The method of converting bi-level auto-rack railcars to tri-level auto rack railcars may be advantageous where changes in consumer preferences lead to a long term reduced demand for shipment of automobiles by bi-level auto rack. A typical bi-level auto rack railcar comprises a flat car supporting a lower deck and a plurality of posts extending upward from the flat car to support an upper deck affixed thereto. A roof structure is affixed to and supported by the upper ends of the posts. The roof structure may comprise a pair of top chords or roof nails, and corrugated roof sheets extending therebetween. In one embodiment, the method comprises severing each of the posts between the flat car and the roof structure, thereby dividing the posts into upper and lower portions, possibly without disconnecting the upper portions of the posts from the roof structure; removing upper portions of the posts with the roof structure; removing the upper deck from the portions of the posts to which it was affixed; adjusting the height of the upper deck and affixing the upper deck to portions of the posts; affixing a second upper deck to portions of the posts; adding extensions to portions of the posts; and assembling the portions of the posts and the extensions.

The step of assembling the posts and extensions may comprise butt welding the posts to the post extensions and welding reinforcing plates some or all sides to the posts and extensions across the butt-welded joints on all sides.

Alternative methods of converting railcars between uni-level, bi-level and tri-level configurations are described below.

In some embodiments, when the railcar is in a bi-level configuration, a third deck may be added by first removing the roof of the bi-level car, then lowering the upper deck or B-deck of the bi-level car, then lowering an additional deck into position as the C-deck using an overhead crane or other suitable equipment, and thereafter replacing the roof.

Figure 12:
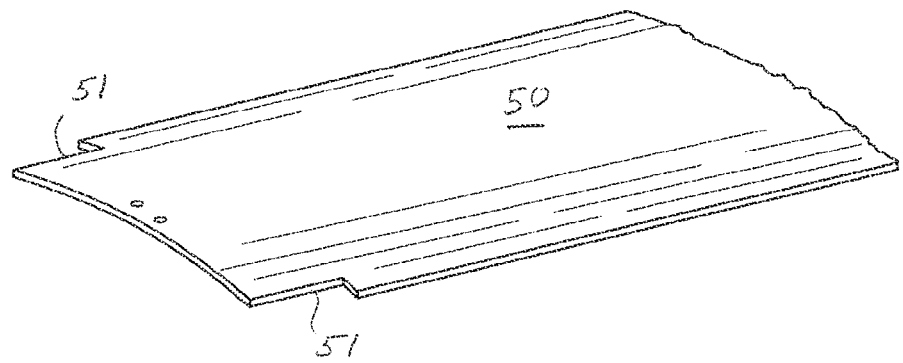
FIG. 12 is a partial view of a roof.
Figure 13:
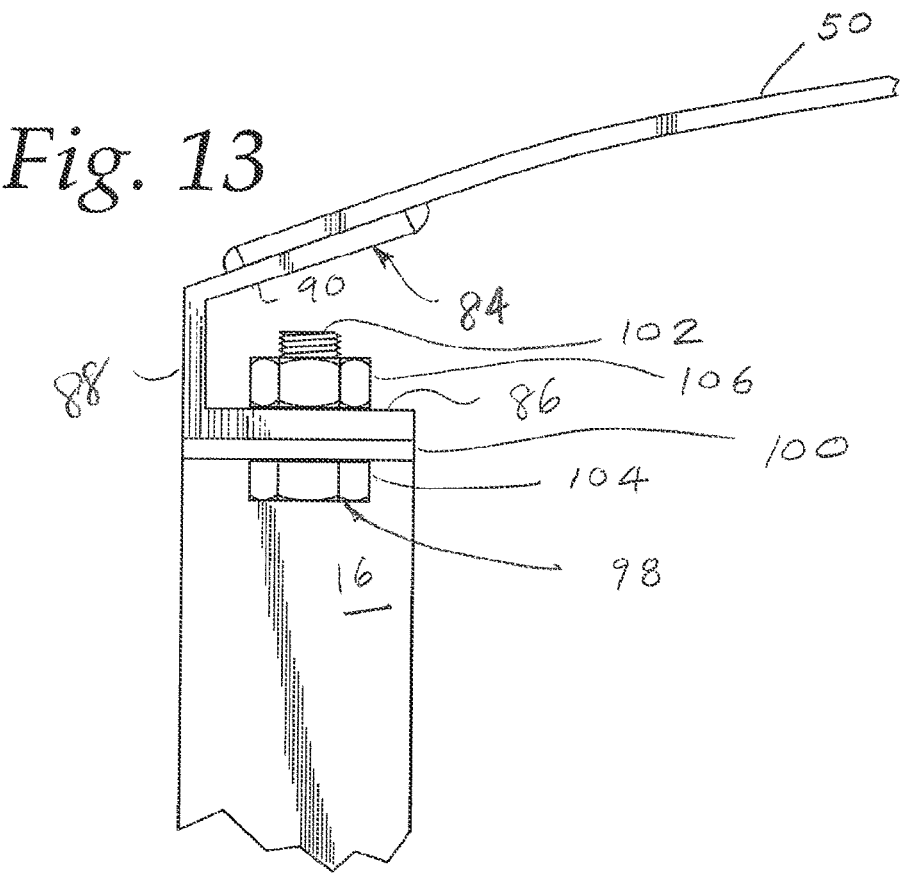
FIG. 13 is a schematic view of a connection between a roof and a post.

In some embodiments, a bi-level autorack car may be built to the maximum allowed height with an upper deck bolted in place. The upper deck of the bi-level car may have hinged end sections locked in the "level" position. That is, the B-deck of the bi-level railcar may have pivotable end sections of the type normally used on the B-deck of tri-level railcars, with the pivotable end sections being secured in place and not pivoted during normal operation of the bi-level railcar. The car may have a bolt-on roof 50 as shown in FIGS. 12 and 13. The car may be converted to a tri-level configuration by removing the bolt-on roof, repositioning the B deck downward from the bi-level B deck position to the tri-level B deck position and enabling the end sections of the B deck to pivot up and down, adding a third deck by lowering it through the open top into the "tri-level" C deck position, fixing it in place, e.g., by bolting or welding, and reattaching the roof. The car may be converted back to a bi-level by reversing these steps.

In another approach, a conventional bi-level (which does not have hinged end sections on its B-deck) may be converted to a tri-level having hinged end sections on its B-deck by the following method: removing the roof; removing the "B" deck; inserting a new "B" deck with hinged ends; re-installing the "B" deck as a "C" deck; and reinstalling the roof.

Figure 14:
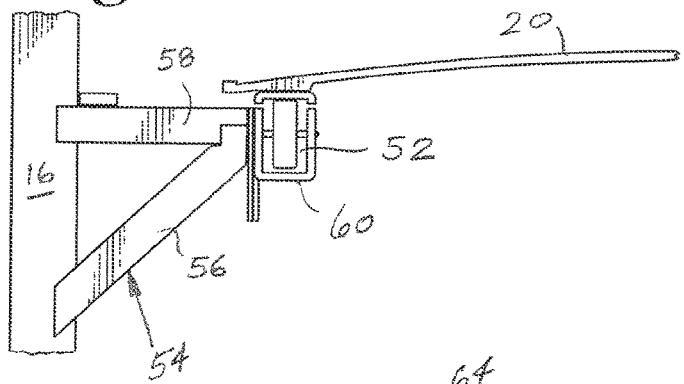
FIG. 14 is a schematic view of apparatus for rolling a deck longitudinally into or out of a railcar such as that of FIGS. 4-7.
Figure 15:
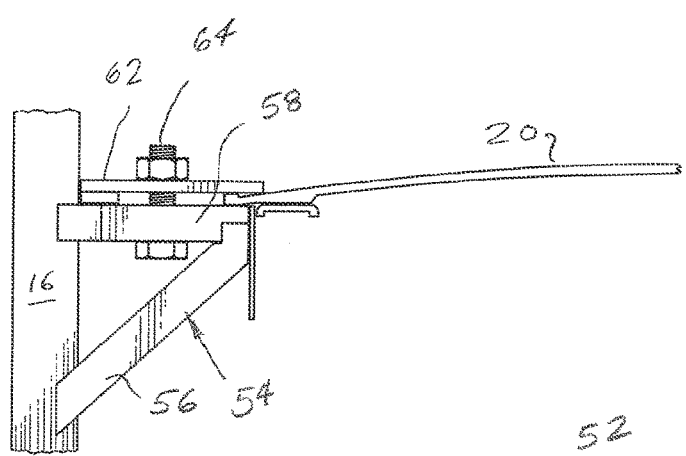
FIG. 15 shows the deck of FIG. 15 in a locked position.
Figure 16:
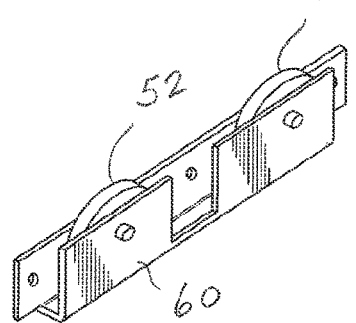
FIG. 16 is a schematic view of a roller assembly that may be used in the apparatus of FIG. 14.

Another approach is to make the conversion from bi-level to tri-level without removing the roof, using rollers. The rollers may be supported by the sidewall posts, braces or other structural elements of the car. The upper deck of the bi-level car may be unbolted from the sides of the car and lowered to the "tri-level" B deck position. The C deck may be installed by first installing deck braces fitted with rollers, and then feeding the C deck into position in the car on the rollers in sections or in one piece. In the embodiment of FIGS. 14-16, rollers 52 are provided on one or more braces 54. Each of the braces comprises a first member 56 extending inward and upward from a sidewall post 16, and a second member 58 extending generally horizontally inward from the post 16, joined to the first member 56 at the upper end thereof. The braces may be welded, bolted or otherwise affixed to some or all of the posts 16.

During longitudinal movement of the deck 18 relative to the supporting structure, the deck is supported at least in part on the rollers 52. As illustrated in FIG. 16, the rollers 52 may be supported for rotation in generally U-shaped frames 60, which may be temporarily or permanently attached to the braces by bolts, welding or other means.

After the deck 18 has been moved longitudinally to an appropriate position, the deck may be jacked up slightly to remove its weight from the rollers, then the rollers may be lowered or removed, and the deck fastened to the braces by bolting or welding. Side fillers may be installed alongside the deck to reduce or eliminate gaps between the sides of the deck and the side walls by bolting or welding. As shown in FIG. 15, a bolt 64 may be inserted through the brace 54 and through side filler 62 to secure the side filler and clamp the edge of the deck 20 between the side filler 62 and the brace 54. The above steps may be reversed to remove the deck 18.

Figure 17:
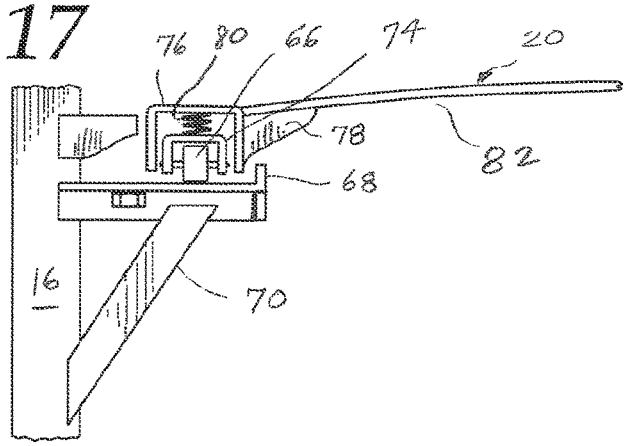
FIG. 17 is a schematic view of another apparatus for rolling a deck into or out of a railcar such as that of FIGS. 4-7.
Figure 18:
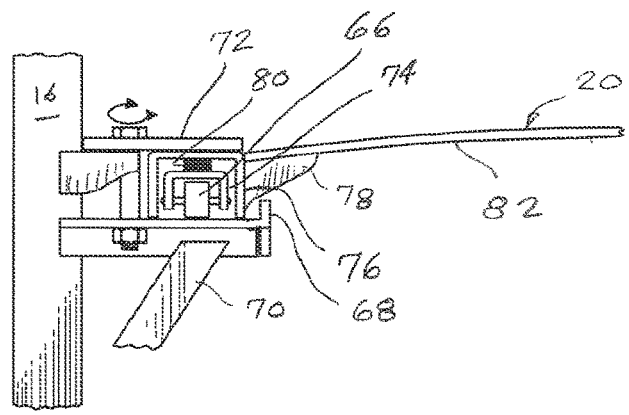
FIG. 18 shows the apparatus of FIG. 17 in a locked position.
Figure 19:
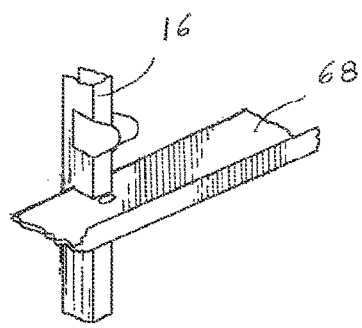
FIG. 19 further illustrates portions of the apparatus of FIGS. 17 and 18.

In another variant, the upper deck of the bi-level car may be fitted with rollers 66 that engage rails or tracks 68 supported by posts 16 and deck braces 70 as shown in FIGS. 17-19.

The rollers may be permanently attached to the deck, or may be removable, e.g., by mounting all of the rollers in a beam that runs along an edge of the deck, and may be removed when the deck is secured. FIGS. 17-19 illustrate an arrangement in which the rollers stay with the deck after it is secured.

As illustrated by FIG. 18, filler plates 72 may extend along the entire length of the deck or along portions thereof, along both sides of the deck 20, and may be bolted down adjacent some or all of the posts to clamp the deck in place. The rollers 66 may be supported for rotation in downwardly opening channel-shaped housings 74, which may in turn be nested within outer downwardly-opening channels 76 and coupled thereto by resilient members 80 such as leaf springs, coil springs, elastomeric members or other suitable devices. The rollers may be provided on both sides of the deck, at both ends, and/or at other locations. Gussets 78 may be provided at spaced intervals along the deck 20 to strengthen the joint between the central portion 82 of the deck 20 and the outer channels 76 extending along each side thereof. The tracks 68 extend beneath and along both sides of the deck 20 along its entire length or along portions thereof. The tracks 68 are supported by braces 70 similar to those of FIGS. 14-16, but with angled members having their upper ends centered directly below or near the rollers 66.

When the deck 20 is to be removed, it may be unbolted so it can roll along the rail as shown in FIG. 17. The side fillers are removed and the deck is rolled out of one end of the car. The rail system is then unbolted from the sides of the car and lowered to the "tri-level" "B" deck position. A new deck is placed on top of the B deck and the two are rolled back into the car on the repositioned rail system. The new deck may then be raised to the "tri-level" "C" deck position, and bolted or welded in place. Braces may be installed under the new C deck, and side fillers may be installed over or under the deck along the length of each side. If the B deck has hinged end sections that were secured in place while the car was in its bi-level configuration, they may be released so that they can be pivoted up and down in the tri-level configuration.

Figure 20:
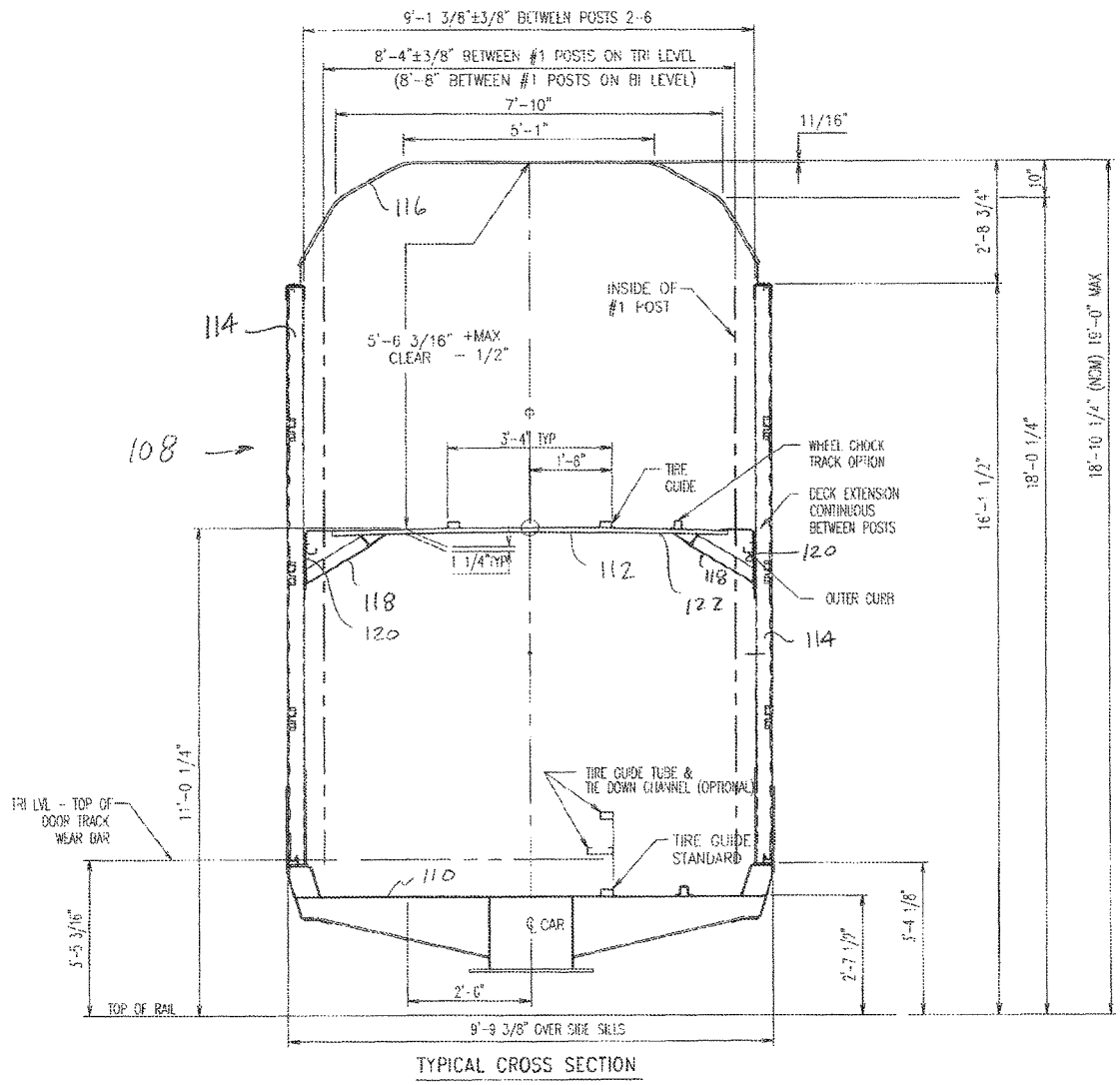
FIGS. 20-22 illustrate a process for converting a bi-level railcar to a tri-level railcar.
Figure 21:
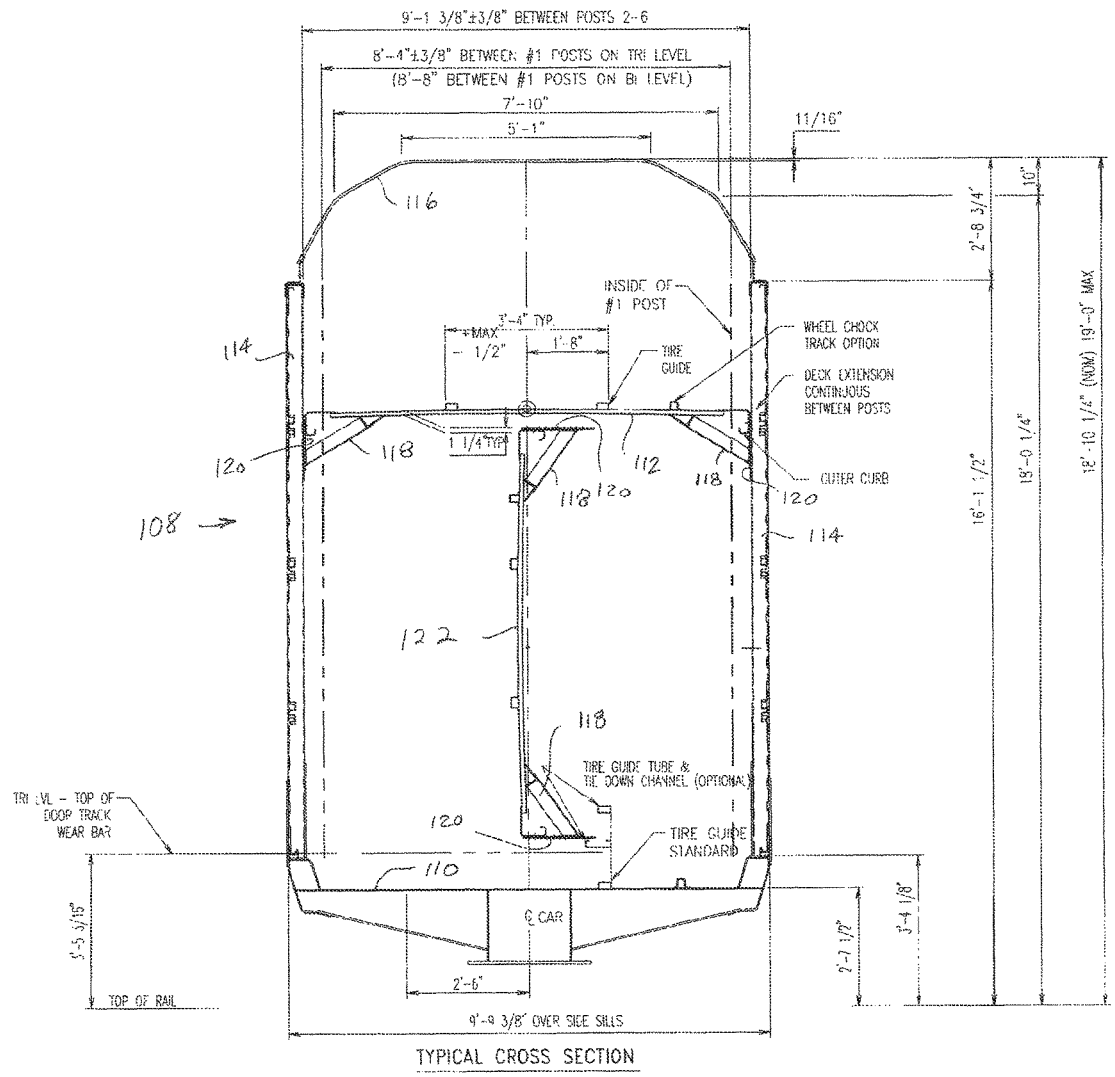
Figure 22:
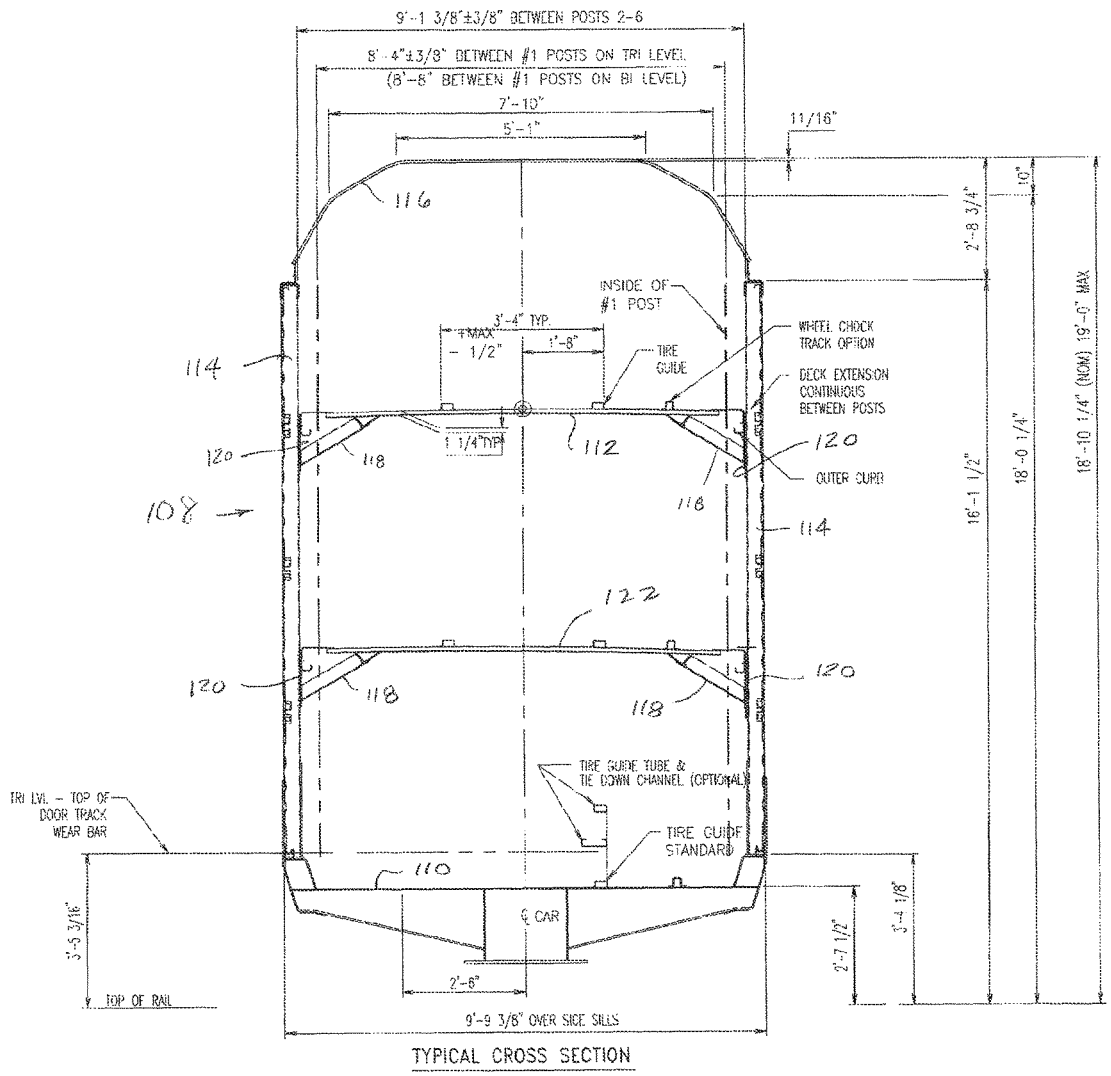

In other embodiments, one or more docks may be added to or removed from a railcar for transporting motor vehicles by moving the deck longitudinally, and twisting the deck about its longitudinal axis to increase clearance relative to side posts as shown in FIGS. 20-22. FIG. 20 is a sectional view of a bi-level autorack car 108 having a first deck 110, a plurality of posts 114 extending upward on opposite sides thereof, a second deck 112 supported on the posts 114 above the first deck, and a roof 116. Braces 118 extend upward and inward from the posts to the second deck 112. The lower/outer ends of the braces are joined to plates 120 which extend upward from the braces to the sides of the deck. The plates 120 are preferably removably attached to posts 114 by bolts or other means to facilitate adjustment of deck position. The bi-level car may be converted to a tri-level car without removal of the roof by disconnecting the upper deck 112 from the posts, raising it and securing it in the position shown in FIG. 21, and inserting a new "B" deck 122 beneath it.

As shown in FIG. 21, the new B deck may be inserted on edge longitudinally into the car through the end of the car. The new deck 122 may be supported at least in part by the first deck 110 during this operation, and rollers or other means may be employed to facilitate its longitudinal movement.

Once the deck 122 is longitudinally positioned for installation, it may be rotated 90° to the position shown in FIG. 22, and bolted or otherwise fixed to the posts 114. To facilitate installation, the new B deck 122 may have braces 118 and connecting plates 120, similar to those described and shown in connection with the second deck 112 attached thereto prior to installation. The connecting plates may be bolted or otherwise fastened to the posts or other structure to secure the deck 122.

The bi-level car of FIG. 20 may alternatively be converted to the tri-level car of FIG. 22 by other methods described herein. The tri-level car of FIG. 22 may be converted to the bi-level car of FIG. 20 by reversing the steps of any of the methods described herein for converting bi-level cars to tri-level cars.

One additional method of converting railcars comprises converting a bi-level or tri-level auto-rack railcar to a unilevel railcar by removing the roof structure to facilitate crane access to the railcar interior; removing one or more decks from the railcar using a crane; and replacing the roof to provide an interior space that is capable of accommodating and enclosing vehicles of a height greater than the spacing between the decks of the bi-level or tri-level car.

Another additional method comprises converting a multilevel autorack railcar to a unilevel railcar using techniques similar to those described above, removing the second deck from the railcar using rollers, mounted, e.g., on the support structure or on the second deck.

Another additional method comprises building a mixed use bi-level railcar in which the B deck is mounted much higher than in conventional bi-level railcars, e.g., at the height of the C deck in a tri-level railcar. A bi-level car with this configuration may be used to transport tall vans such as Sprinter vans or other tall vehicles on its A deck while transporting conventional vehicles on its B deck. This type of bi-level car can be built by removing the B deck from a tri-level railcar by any of the methods described in this application without other major structural changes.

Another additional method comprises building a mixed use bi-level railcar in which the B deck is mounted lower than in conventional bi-level railcars, e.g., at the height of the B deck in a conventional tri-level car. A bi-level car with this configuration may be used to transport tall vans such as Sprinter vans or other tall vehicles on its B deck while transporting conventional vehicles on its A deck. This type of bi-level car can be built by removing the C deck from a tri-level railcar by any of the methods described in this application without other major structural changes.

A method of installing a removable roof on an autorack railcar may comprise installing removable longitudinal roof supports 84 (FIG. 13) on upper portions of the side walls, and thereafter attaching the roof 50 to the longitudinal roof supports. Installing removable longitudinal roof supports on upper portions of the sidewalls may comprise bolting them to upper ends of sidewall posts. The roof 50 may comprise a plurality of sections, or may be one piece, end to end, with no transitions. As shown in FIG. 12, the roof may have offsets 51 at its ends for radial end doors.

The roof supports 84 may comprise generally channel-shaped members extending the entire length of the railcar along each side. Each roof support may comprise a bottom flange 86, a web 88 and a top flange 90. The top flange may extend inward and upward consistent with the slope of the roof. The bottom flange may be horizontal or otherwise oriented, and the web may be vertical or otherwise oriented. The roof 50 may be welded to the top flange 90 with an inner bead 94 and/or an outer bead 96 along the entire length of the roof or along portions thereof. The roof supports 84 may be attached to top flanges 100 of posts 16 by fasteners 98. The fasteners are preferably easily removable from the inside of the railcar only. Each fastener may comprise, e.g., a bolt having a shank 102 extending upward from a head 104 through openings in the flanges 100 and 86, with a nut 106 or other device engaging the shank to secure it in place. The nut may be welded to the roof support 84. In other embodiments, cap screws may be employed with their heads on the outside of the car, and nuts secured to them on the inside of the railcar. In still other embodiments, other fasteners may be used. When replacing the roof, new fasteners may be used to secure it in place, with the fasteners, such as cap screws, bolts or the like, being loosely secured first, then torqued as required.

Figure 10:
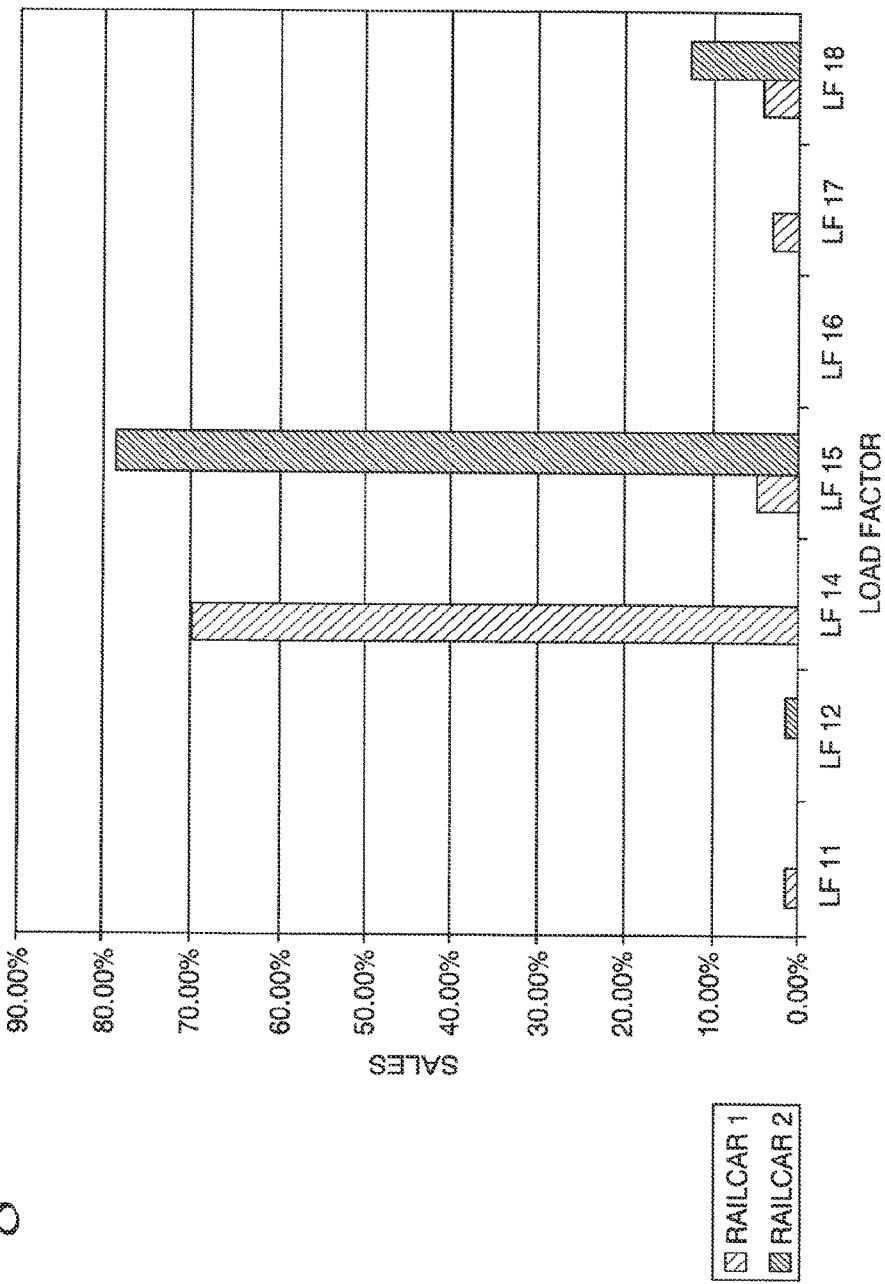
FIG. 10 illustrates the percentages of vehicles sold that may be carried with various load factors on each of two railcars.

Employing a tri-level railcar as shown in FIGS. 4-7 with substantially horizontal decks and with dimensions as described above can result in a dramatic increase in the percentage of passenger cars that can be transported with a load factor of at least 15, as shown in Table 3 below and illustrated in FIG. 10. In Table 3, Railcar 1 is a typical prior art tri-level auto rack railcar. Railcar 2 is a tri-level railcar having an overall height of 20' 2" built in accordance with the above description and as shown in FIGS. 4-8, on a flat car having a 39.5 in. ATR running surface, with a substantially horizontal A-deck and a minimum clearance of about 65.in. over each deck, such that vertical clearance of at least 4 in. is provided for automotive vehicles of up to 61 in. in height. The first column lists load factors (LF), and data in the columns labeled Railcar 1 and Railcar 2 indicate the percentages of passenger cars manufactured in the first eleven months of 2008 for each load factor, based on requiring vertical clearance of at least 4 in.

TABLE 3

Load Factors of Railcar 1 vs. Railcar 2

|  | Railcar 1 | Railcar 2 |
| --- | --- | --- |
| LF 11 | 1.33% |  |
| LF 12 |  | 1.33% |
| LF 13 |  |  |
| LF 14 | 69.87% |  |
| LF 15 | 4.75% | 78.60% |
| LF 16 |  |  |
| LF 17 | 3.03% |  |
| LF 18 | 3.84% | 12.29% |

Thus, Table 3 shows that Railcar 1 has a load factor of 15 for 4.75% of the cars, a load factor of 17 for 3.03%, and a load factor of 18 for only 3.84%. The total of the percentages for these three load factors is 11.62%. Thus, for Railcar 1, only about 11.62% of the passenger cars in the data set can be transported with a load factor of 15 or more. In contrast, the railcar described above is capable of transporting over 90% of the passenger cars in the data set with a load factor of 15 or more. It should be noted that, while the data Table 3 is based in part on requiring at least 4 in. of vertical clearance, it may be determined that a reduced amount of vertical clearance will be acceptable for Railcar 2 in view of the elimination of bouncing associated with travel over conventional ramps. This may further increase the percentages of vehicles associated with the indicated load factors. From the foregoing, it is apparent that the preferred embodiments described above provide improved methods of shipping motor vehicles, improved auto rack railcars, and improved methods of manufacturing and converting auto rack railcars. The invention is not limited to the preferred embodiments described above. The invention is further described in the following claims.

The invention claimed is:

1. A method of converting a bi-level auto-rack railcar to a tri-level auto rack railcar, the bi-level auto rack railcar comprising a first deck, a second deck above the first deck, a roof structure, side walls extending from the first deck to the roof, and end doors extending between the first deck and the roof, the method comprising:
   removing the roof structure;
   adjusting the height of the second deck;
   lowering a third deck into the railcar above the second deck using an overhead crane; and
   replacing the roof.

2. A method of converting a bi-level auto-rack railcar to a unilevel railcar, the bi-level autorack railcar comprising a first deck capable of supporting motor vehicles for transport in commercial rail operation, a second deck spaced above the first deck by a distance sufficient to provide clearance for vehicles on the first deck, the second deck also being capable of supporting motor vehicles for transport in commercial rail operation, a roof structure, side walls extending from the first deck to the roof, and end doors extending between the first deck and the roof, the end doors being movable between open positions in which access to the railcar interior is permitted, and closed positions in which the interior of the railcar is fully enclosed to prevent unauthorized access, the method comprising:
   removing the roof structure to facilitate crane access to the railcar interior;
   removing the second deck from the railcar using a crane; and
   replacing the roof to provide an interior space that is capable of accommodating and enclosing vehicles of a height greater than the distance by which the second deck was spaced above the first deck.

* * * * *